United States Patent [19]

Behnke et al.

[11] 4,273,371
[45] Jun. 16, 1981

[54] CLAW HOOK ASSEMBLY

[75] Inventors: Edward R. Behnke, Lockport; Floyd W. Sanderson, Grand Island, both of N.Y.

[73] Assignee: Columbus McKinnon Corporation, Tonawanda, N.Y.

[21] Appl. No.: 50,180

[22] Filed: Jun. 20, 1979

[51] Int. Cl.³ .................. B66C 1/34; F16G 15/04
[52] U.S. Cl. .................. 294/78 R; 24/116 R; 59/93; 294/82 R
[58] Field of Search ............ 294/74, 78 R, 78 A, 294/82 R, 83 R; 24/73 A, 73 CE, 73 HH, 73 HL, 73 HR, 73 TH, 116 R, 116 A, 230.5 R, 230.5 AD; 59/85, 86, 93

[56] References Cited

U.S. PATENT DOCUMENTS

| 290,785 | 12/1883 | Millard | 294/82 R |
|---|---|---|---|
| 864,652 | 8/1907 | King | 24/116 R X |
| 1,025,353 | 5/1912 | White | 294/82 R |
| 2,226,755 | 12/1940 | Ehmann | 59/86 |
| 3,027,615 | 4/1962 | Forney | 24/116 R |
| 3,233,933 | 2/1966 | Coski | 294/74 |
| 3,289,258 | 12/1966 | Eriksson | 294/78 R X |
| 3,747,971 | 7/1973 | Yake | 294/82 R |

FOREIGN PATENT DOCUMENTS

| 830449 | 2/1952 | Fed. Rep. of Germany | 59/93 |
|---|---|---|---|
| 305295 | 2/1929 | United Kingdom | 294/74 |

Primary Examiner—Johnny D. Cherry
Attorney, Agent, or Firm—Bean, Kauffman & Bean

[57] ABSTRACT

A double ended chain engaging device useful as a chain-to-chain connector or as a chain shortener used to engage different parts of the same interconnected link type chain. A first chain grappling hook member formed with an eye end is articulately joined to the clevis end of a second chain grappling member by a load bearing pin.

7 Claims, 12 Drawing Figures

Fig. 9.
Fig. 10.
Fig. 12.
Fig. 11.
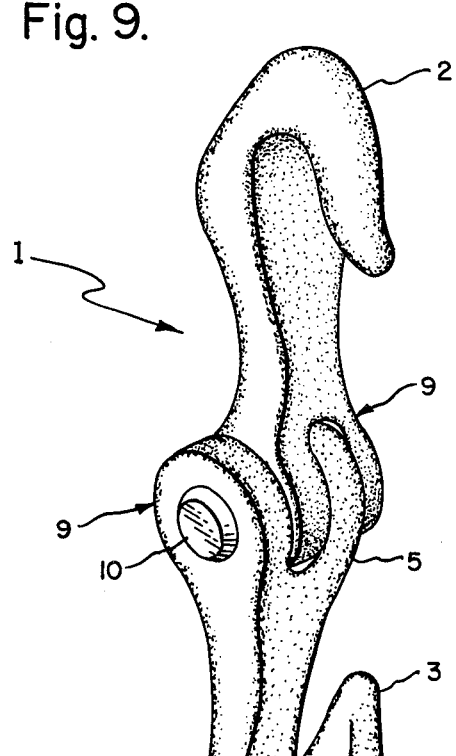
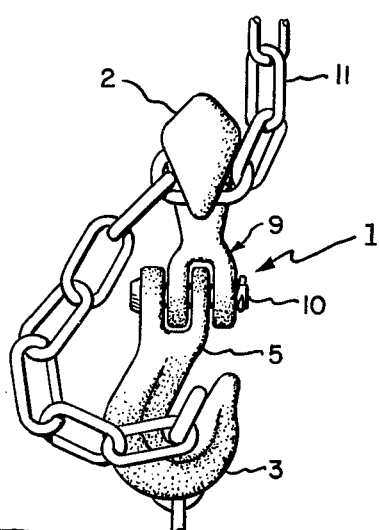
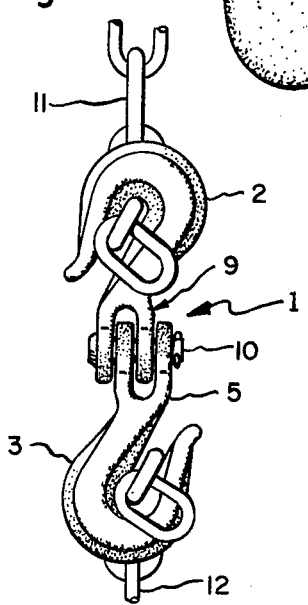
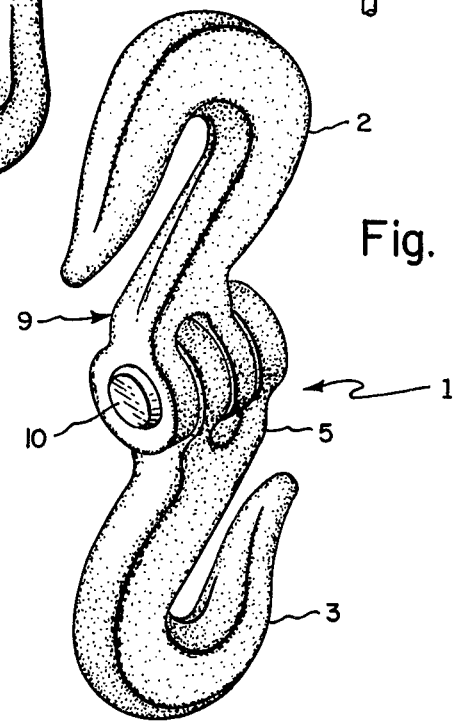

CLAW HOOK ASSEMBLY

TECHNICAL FIELD OF THE INVENTION

The present invention relates to interconnected link type load chain engaging devices. More specifically, the invention relates to double ended chain shorteners or chain couplers.

BACKGROUND OF THE INVENTION

Innumerable occasions arise in many industrial applications in which it is found desirable to connect one chain to another or to shorten the length of a chain. In such circumstances, any one of a variety of devices may be used. For example, any of the chain grab or claw hooks such as those disclosed in U.S. Pat. Nos. 3,741,599; 3,601,978; 1,470,481; 3,673,646; 2,978,767; 3,333,412, or 3,233,933 may be attached to the end of a chain by a conventional shackle and load pin. The procedure of attaching a single hook to one end of a chain, however, involves considerable time and inconvenience. Subsequent removal of the attached hook, while seemingly of a trivial nature, may become very difficult to execute if the load pin has been bent or otherwise distorted while loaded, so that considerable additional time and effort may be extended in extracting the load pin.

Efforts to cure the above described difficulties in the use of a load pin-shackle-grab or claw hook for chain shortening or chain-to-chain connection have led to the development of a large number of chain-to-chain connecting devices exemplified by U.S. Pat. Nos. 3,747,971; 3,027,615; 3,041,041; 3,511,527; 1,224,148; 1,531,770; 1,758,744; 1,314,747; and 3,729,926, as well as the well known coupler or shortening device which consists of a pair of eye type chain grab hooks connected by a short length of interconnecting chain. Each of the devices disclosed in the patents listed above, however, have the shortcoming that they are specially adapted for the singular purpose of chain shortening or chain-to-chain connecting. They are not adapted for permanent or removable attachment to the end of a chain as a load bearing device. Accordingly, a workman must have on hand not only the chain coupling and shortening devices but also one or more conventional hooks which may be attached to the end of a chain as previously described.

THE INVENTION

To overcome the deficiencies and disadvantages of the prior art chain shortening or chain coupling techniques, according to a preferred embodiment of this invention, there is provided an articulated load bearing connecting device adapted to engage, at each of its opposite ends, a link of an interconnected link type load chain. Generally speaking, the articulated chain connecting device includes a first chain grappling member or chain hook whose first end is adapted to engage a load chain and whose second end includes an eye, a second chain grappling member or chain hook whose first end is also adapted to engage a load chain and whose second end is formed in a bifurcated clevis adapted to receive therein the eye of the first chain hook, and a load pin extending through both the eye of the first hook and the pair of laterally extending passages formed through the opposite portions of the bifurcated clevis of the second hook. In this manner the first and second hooks are interconnected in an articulated joint. According to the invention, either or both of the first and second chain grappling members may be a chain claw hook or a chain grab hook. Furthermore, the first and second chain grappling members may be oriented relative to one another such that each engages its respective chain at an angle rotated through 90° from the other.

BRIEF DESCRIPTION OF THE DRAWINGS

The present invention may be better understood and its numerous objects and advantages will become apparent to those skilled in the art by reference to the accompanying drawings, wherein like reference numerals refer to like elements in the several figures and in which:

FIGS. 9 and 11 illustrate fifth and sixth embodiments of the invention wherein a pair of grab hooks, each with a bifurcated clevis shank, are utilized; and FIGS. 10 and 12 illustrate practical application of the embodiments shown in FIGS. 9 and 11 respectively.

DESCRIPTION OF THE BEST MODE OF THE INVENTION

Figure 1:
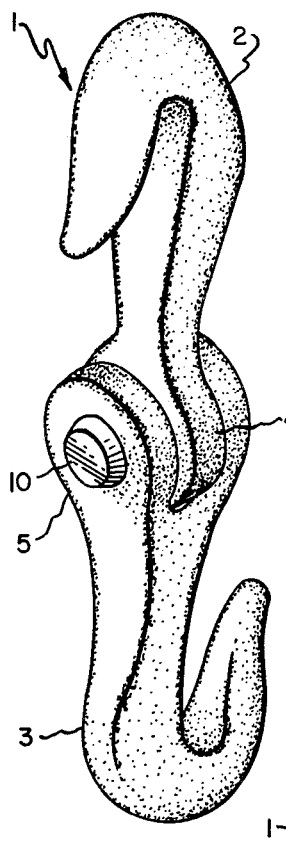
FIG. 1 illustrates one embodiment of the invention wherein two grab hooks are utilized.

While the invention is susceptible of various modifications and alternative constructions, there is shown in the drawings and there will hereinafter be described, in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims to the full range of their equivalents.

Turning now to an examination of the figures, it can be seen that the invention generally consists of first and second chain engaging members, such as the hooks shown, connected for articulation at an intermediate position. For example, FIG. 1 discloses a connecting device 1 which comprises a chain grab hook 2 having a chain engaging hook portion at its first end and a shank portion 4 formed at its second end to include an eye. A second chain engaging member or chain grab hook 3 is provided with a chain engaging hook portion at its first end and a clevis 5 formed at its second end. As can be seen, clevis 5 consists of a bifurcated pair of upstanding ears, each of which includes a laterally formed passage therethrough. When assembled, the eye portion 4 is received within the bifurcated clevis portion 5 of the opposite member 3 and load pin 10 is inserted through their respective passages to consummate their unions in an articulated joint.

Figure 3:
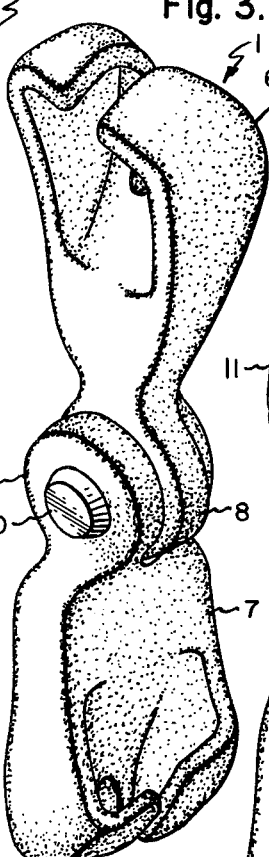
FIG. 3 illustrates a second embodiment of the invention wherein two claw hooks are utilized.
Figure 6:
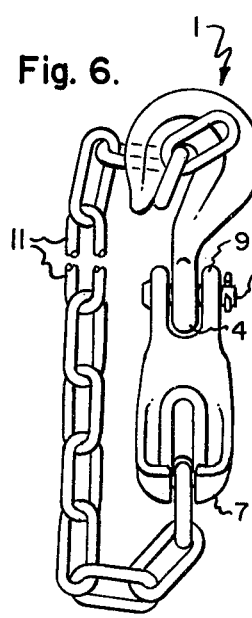
FIG. 6 illustrates a practical application of the device of FIG. 5 in which it is shown forming a length of chain into a loop or sling.
Figure 5:
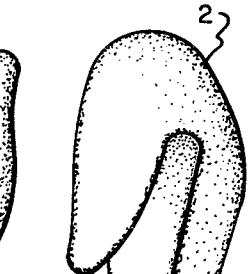
FIG. 5 illustrates a third embodiment of the invention wherein a claw hook and a grab hook are utilized.
Figure 7:
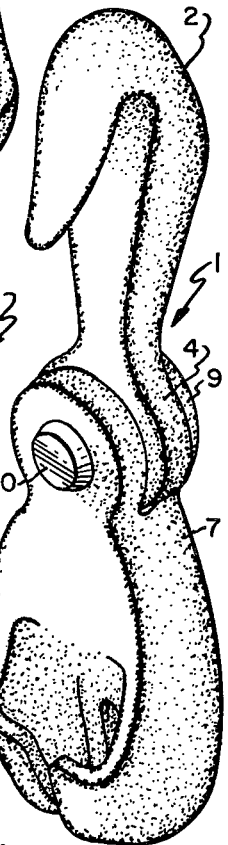
FIG. 7 illustrates a fourth embodiment of the invention wherein a grab hook and claw hook are utilized.

Similar embodiment are shown respectively in FIGS. 3, 5 and 7. Thus it can be seen that in FIG. 3 the chain shortening or connecting device 1 consists of a pair of claw hooks 6 and 7 formed at one end to include an eye portion 8 and a clevis portion 9 respectively so that an articulated interconnection can be formed by the appropriate insertion of load pin 10. FIGS. 5 and 6 illustrate variations of the two basic combinations shown in FIGS. 1 and 3 inasmuch as each consists of a chain grab hook 2 and a chain claw hook 7. It should be noted that FIG. 7 differs from FIG. 5 by the angular relationship between the chain grabbing members at opposite ends of the device. Furthermore, it should be noted that the chain connecting or shortening devices of FIGS. 1 and 3 could also be modified to exhibit angular relationships between opposite ends thereof in a manner similar to those shown in FIGS. 5 and 7. The angular orientations between opposite ends of the chain shortening or connecting devices shown are of significance since a chain is not universally flexible but can be twisted only in certain limited manners. This is especially true when the chain is tensioned. Therefore, it might be found desirable in a particular application to have a particular angular relationship between opposite ends of the connecting device while in a different application a different angular relationship would be more suitable.

Figure 2:
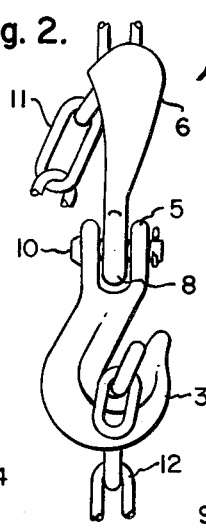
FIG. 2 illustrats one practical application of a device similar to FIG. 1 in which it is shown connecting the ends of two chains wherein one grab hook and one claw hook are utilized.

FIGS. 2, 4, 6 and 8 illustrate a non-exhaustive variety of applications for which the chain connecting or shortening devices of the present invention are suitable. In FIG. 2, a pair of chains 11 and 12 are interconnected by the load bearing connecting device 1 as illustrated. FIG. 2 depicts a device similar to that of FIG. 1 except that the upper grab hook is replaced by a claw hook 6 having an eye fitting between the clevis of the lower grab hook 3. While FIG. 2 shows chains 11 and 12 connected by the connecting device at a point intermediate the ends of at least one chain, it should be recognized that the chain connecting device is capable of engaging each of the chains 11 and 12 at their extreme ends. Furthermore, while the chain connecting device 1 shown in FIG. 2 has been illustrated connecting two opposite chains 11 and 12, it should also be evident that the chain connecting device 1 may function as a temporary connecting or replacement link in the event of the failure of a single chain by rupture of one of its links intermediate its opposite ends.

Figure 4:
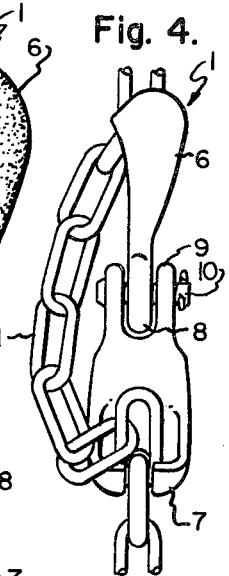
FIG. 4 illustrates a practical application of the device of FIG. 3 in which it is shown shortening a single chain.

FIG. 4 illustrates the load bearing device of the present invention when used as a chain shortener. As can be seen, chain 11 is engaged at two different positions therealong by the opposite chain claw hooks 6 and 7 by lateral engagement. Each of the other devices shown in FIGS. 1, 5 and 7 as well as other variations are also suitable for this application.

Figure 8:
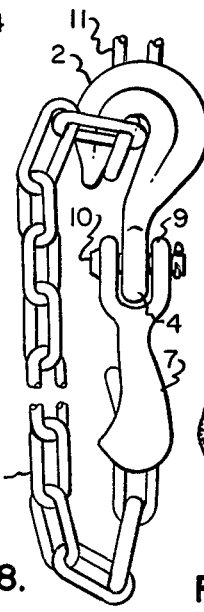
FIG. 8 illustrates a practical application of the device of FIG. 7 in which it is shown forming a loop at the end of a chain.

FIGS. 6 and 7 each illustrate their respective chain connecting and/or shortening devices in an application in which the chain 11, with the assistance of device 1, is formed into a loop or a sling. In FIG. 6 the loop is formed by engaging opposite ends of chain 11 by the chain connecting device of the present invention. In FIG. 8 a loop is made at the end of chain 11 by engaging the terminal link of chain 11 by one end of the chain connecting device and by engaging an intermediate portion of chain 11 by the second end of the chain engaging device of the present invention.

FIGS. 9 and 11 illustrate an additional pair of embodiments of the invention in which a grab hook 2 having a bifurcated clevis shank portion 9 is articulately connected to a grab hook 3 also having a bifurcated clevis shank portion 5. The respective clevis portions 5 and 9 are disposed to interdigitate one with the other and are pivotally fastened together for articulation by the expedient of load pin 10. FIGS. 10 and 12 respectively illustrate practical applications of the embodiments shown in FIGS. 9 and 11. It should be noted that the embodiment of FIG. 9 shows the opposite grab hooks 2 and 3 lying in different planes while the embodiment of FIG. 11 shows the opposite grab hooks 2 and 3 lying in the same plane as may be desired.

What is claimed is:

1. In an articulated load bearing connecting device adapted to engage at each of its opposite ends a link of an interconnecting link type load chain, the improvement which comprises in combination:
   a. a first chain grappling member having a first open end adapted to removably engage a load chain and a second end having an eye;
   b. a second chain grappling member having a first open end adapted to removably engage a load chain and a second end formed in a bifurcated clevis adapted to receive said second end of said first chain grappling member between the opposite portions of said bifurcated clevis, said clevis including a laterally extending passage through each opposite portion of said bifurcated clevis whereby said passage and said eye may be brought into axial alignment; and
   c. a load pin extending through said laterally extending passage and said eye to interconnect said first and second chain grappling members in an articulated joint.

2. The articulated load bearing connecting device as recited in claim 1 wherein said first and second chain grappling members are both chain grab hooks.

3. The articulated load bearing connecting device as recited in claim 1 wherein said first and second chain grappling members are a chain grab hook with its second end having an eye and a chain claw hook with its second end having a clevis.

4. The articulated load bearing connecting device as recited in claim 1 wherein said first and second chain grappling members are a chain claw hook with its second end having an eye and a chain grab hook with its second end having a clevis.

5. The articulated load bearing connecting device as recited in claim 1 wherein said first and second chain grappling members are both chain claw hooks.

6. The articulated load bearing connecting device as recited in claim 1 wherein said first and second chain grappling members have orientations such that each engages its respective chain at an angle rotated through 90° from the other.

7. In an articulated load bearing connecting device adapted to engage at each of its opposite ends a link of an interconnected link type load chain, the improvement which comprises in combination;
   a. a first chain grappling member having a first open end adapted to removably engage a load chain and a second end having a bifurcated clevis;
   b. a second chain grappling member having a first open end adapted to removably engage a load chain and a second end having a bifurcated clevis adapted to mate with said second end of said first chain grappling member, the clevis of each of said first and second chain grappling members having a laterally extending passage through each opposite portion of the bifurcated clevis whereby the passage of each of said first and second chain grappling members may be positioned in axial alignment one with the other when the opposite portions of the bifurcated clevis of said first and second chain grappling members are disposed in an interdigitating arrangement; and c. a load pin extending through both of said laterally extending passages to interconnect said first and second chain grappling members in an articulated joint.

* * * * *